United States Patent
Li

(10) Patent No.: US 11,200,159 B2
(45) Date of Patent: Dec. 14, 2021

(54) SYSTEM AND METHOD FOR FACILITATING EFFICIENT UTILIZATION OF NAND FLASH MEMORY

(71) Applicant: Alibaba Group Holding Limited, Grand Cayman (KY)

(72) Inventor: Shu Li, Bothell, WA (US)

(73) Assignee: Alibaba Group Holding Limited, George Town (KY)

( * ) Notice: Subject to any disclaimer, the term of this patent is extended or adjusted under 35 U.S.C. 154(b) by 88 days.

(21) Appl. No.: 16/679,994

(22) Filed: Nov. 11, 2019

(65) Prior Publication Data

US 2021/0141721 A1 May 13, 2021

(51) Int. Cl.
| | | |
|---|---|---|
| G06F 3/06 | (2006.01) | |
| G06F 12/02 | (2006.01) | |
| G06F 12/0871 | (2016.01) | |
| G06F 11/10 | (2006.01) | |
| H04L 29/06 | (2006.01) | |

(52) U.S. Cl.
CPC .......... *G06F 12/0246* (2013.01); *G06F 3/064* (2013.01); *G06F 3/067* (2013.01); *G06F 3/0608* (2013.01); *G06F 3/0665* (2013.01); *G06F 3/0679* (2013.01); *G06F 11/1068* (2013.01); *G06F 12/0284* (2013.01); *G06F 12/0871* (2013.01); *H04L 63/062* (2013.01); *G06F 2211/104* (2013.01)

(58) Field of Classification Search
CPC .. G06F 12/0246; G06F 3/0608; G06F 3/0604; G06F 3/0679
USPC ....................................................... 711/154
See application file for complete search history.

(56) References Cited

U.S. PATENT DOCUMENTS

| | | | |
|---|---|---|---|
| 6,148,377 A | 11/2000 | Carter | |
| 9,740,633 B2* | 8/2017 | Chiu | ................... G06F 16/9017 |
| 10,235,198 B2 | 3/2019 | Qiu | |
| 2011/0055471 A1 | 3/2011 | Thatcher | |
| 2011/0099418 A1 | 4/2011 | Chen | |
| 2011/0161784 A1 | 6/2011 | Selinger | |
| 2013/0054869 A1* | 2/2013 | Tolia | ....................... G06F 16/00 |
| | | | 711/102 |
| 2013/0080391 A1 | 3/2013 | Raichstein | |
| 2014/0082273 A1 | 3/2014 | Segev | |
| 2015/0301964 A1 | 10/2015 | Brinicombe | |
| 2015/0363271 A1 | 12/2015 | Haustein | |
| 2017/0147499 A1 | 5/2017 | Mohan | |

(Continued)

FOREIGN PATENT DOCUMENTS

WO          9418634          8/1994

*Primary Examiner* — Than Nguyen
(74) *Attorney, Agent, or Firm* — Shun Yao; Park, Vaughan, Fleming & Dowler LLP

(57) ABSTRACT

The system receives a request to write data and associated metadata. The system determines a key associated with the data, wherein the key corresponds to an entry in a data structure maintained by a first storage system. The system writes the metadata to a first non-volatile memory of a first set of storage drives of the first storage system by updating the entry with a logical block address for the data and a physical location in a second set of storage drives of a second storage system. The system writes the key and the data to a second non-volatile memory of the second set of storage drives based on the physical location, wherein the first non-volatile memory is of a lower density than the second non-volatile memory.

20 Claims, 9 Drawing Sheets

(56) References Cited

U.S. PATENT DOCUMENTS

2018/0107591 A1   4/2018  Smith
2018/0143780 A1*  5/2018  Cho .................... G06F 3/0688
2019/0205206 A1   7/2019  Hornung

* cited by examiner

SYSTEM AND METHOD FOR FACILITATING EFFICIENT UTILIZATION OF NAND FLASH MEMORY

BACKGROUND

Field

This disclosure is generally related to the field of data storage. More specifically, this disclosure is related to a system and method for facilitating efficient utilization of NAND flash.

Related Art

The proliferation of the Internet and e-commerce continues to create a vast amount of digital content. Various distributed storage systems have been created to access and store such digital content. A storage system can include volatile memory (e.g., dynamic random access memory (DRAM)) and multiple drives (e.g., a solid state drive (SSD) or a hard disk drive (HDD)). A drive can include non-volatile memory in a physical storage medium for persistent storage, such as Not-And (NAND) flash memory in an SSD.

NAND flash memory can store a certain number of bits per cell. For example: a single-level cell (SLC) memory element can store one bit of information per cell; a multi-level cell (MLC) memory element can store two bits of information per cell; a triple-level cell (TLC) memory element can store three bits of information per cell; and a quad-level cell (QLC) memory element can store four bits of information per cell. As the number of bits per cell increases, so decreases the cost of the associated SSD as well as the endurance. Furthermore, as the density and capacity of memory elements continue to increase (e.g., three-dimensional stacking and inserting more bits in one NAND cell, such as in the high-density QLC NAND), the performance of the high-density NAND may decrease. While the performance of a sequential write in a high-density NAND (such as QLC) may be similar to the performance of a sequential write in a lower-density NAND (such as TLC or MLC), a significant difference exists between the high-density NAND and the lower-density NAND in the case of a read operation and a random write.

Thus, while deploying the high-density NAND in a data center may result in a decreased cost and an increase in storage capacity, some challenges remain in efficiently utilizing the high-density NAND. One solution involves using a tiered storage hierarchy by placing a faster media (such as an Optane drive) in front of the QLC SSD, where this faster media can serve as the write cache for the QLC SSD. However, while this solution may address the challenges associated with the performance of a random write operation, the performance of a read operation may still suffer because reading from the high-density NAND generally incurs a higher latency than reading from a lower-density NAND. This can result in challenges in efficiently utilizing the high-density NAND and in deploying the high-density NAND in a data center.

SUMMARY

One embodiment provides a system and method for facilitating efficient utilization of NAND flash. During operation, the system receives a request to write data and associated metadata to a non-volatile memory. The system determines a key associated with the data, wherein the key corresponds to a first entry in a data structure maintained by a first storage system. The system writes the metadata to a first non-volatile memory of a first set of storage drives of the first storage system by updating the first entry with a logical block address for the data and a physical location in a second set of storage drives of a second storage system. The physical location can be a next sequentially available location in the second set of storage drives. The system writes the key and the data to a second non-volatile memory of the second set of storage drives based on the physical location, wherein the first non-volatile memory of the first set of storage drives is of a lower density than the second non-volatile memory of the second set of storage drives.

In some embodiments, a write cache for the second set of storage drives comprises a third storage drive which includes a third non-volatile memory of a lower density than the second non-volatile memory of the second set of storage drives. The first, second, or third non-volatile memory can also comprise other types of physical media for persistent storage, e.g., magneto resistive random access memory (MRAM), resistive random access memory (ReRAM), Phase Change Memory (PCM), etc.

In some embodiments, prior to receiving the write request, the system allocates keys in the data structure in an ascending order. In response to determining a condition to compact metadata stored in the data structure, the system compacts the metadata stored in the data structure without physically moving any corresponding data stored in the second set of storage drives.

In some embodiments, the first entry in the data structure indicates one or more of: a key associated with the data; a logical block address or a starting point for the data; a length of the data; a number of logical block addresses associated with the data; a number of logical block addresses corresponding to the key; an identifier of one or more storage drives of the second set to which a portion of the data is written; a data path associated with one or more storage drives of the second set to which a portion of the data is written; a physical location in the set of second storage drives to which the data is written; and a physical block address in the set of second storage drives at which the data is written.

In some embodiments, the key and the data written to the second non-volatile memory comprise a key-value pair. The system writes the key-value pair to the second non-volatile memory of the second set of storage drives by the following operations. The system encodes, based on an erasure code (EC), the key-value pair to obtain a first EC codeword which includes a first parity. The system divides the first EC codeword into a plurality of parts based on a number of logical block addresses corresponding to the key. The system determines one or more physical locations in a plurality of the second set of storage drives to which to write the parts. The system writes the parts to the plurality of the second set of storage drives based on the one or more physical locations.

In some embodiments, the second non-volatile memory of the second set of storage drives comprises quad-level cell (QLC) NAND flash. The first non-volatile memory of the first set of storage drives comprises one or more of: single-level cell (SLC) NAND flash; multi-level cell (MLC) NAND flash; and triple-level cell (TLC) NAND flash.

In some embodiments, the system receives a request to read the data from the non-volatile memory. The system determines the key associated with the data. The system obtains, based on the key, the metadata from the first set of storage drives by identifying the first entry in the data structure, wherein the first entry indicates one or more physical locations in the second set of storage drives at which the data is stored. The system retrieves, based on the one or more physical locations, the data from the second set of storage drives.

In some embodiments, the system determines, based on the retrieved data, a first EC codeword which includes a first parity. The system decodes the first EC codeword to obtain the data. The system verifies the obtained data based on the first parity. The system returns the obtained data to a requesting application.

BRIEF DESCRIPTION OF THE FIGURES

In the figures, like reference numerals refer to the same figure elements.

DETAILED DESCRIPTION

Figure 1:
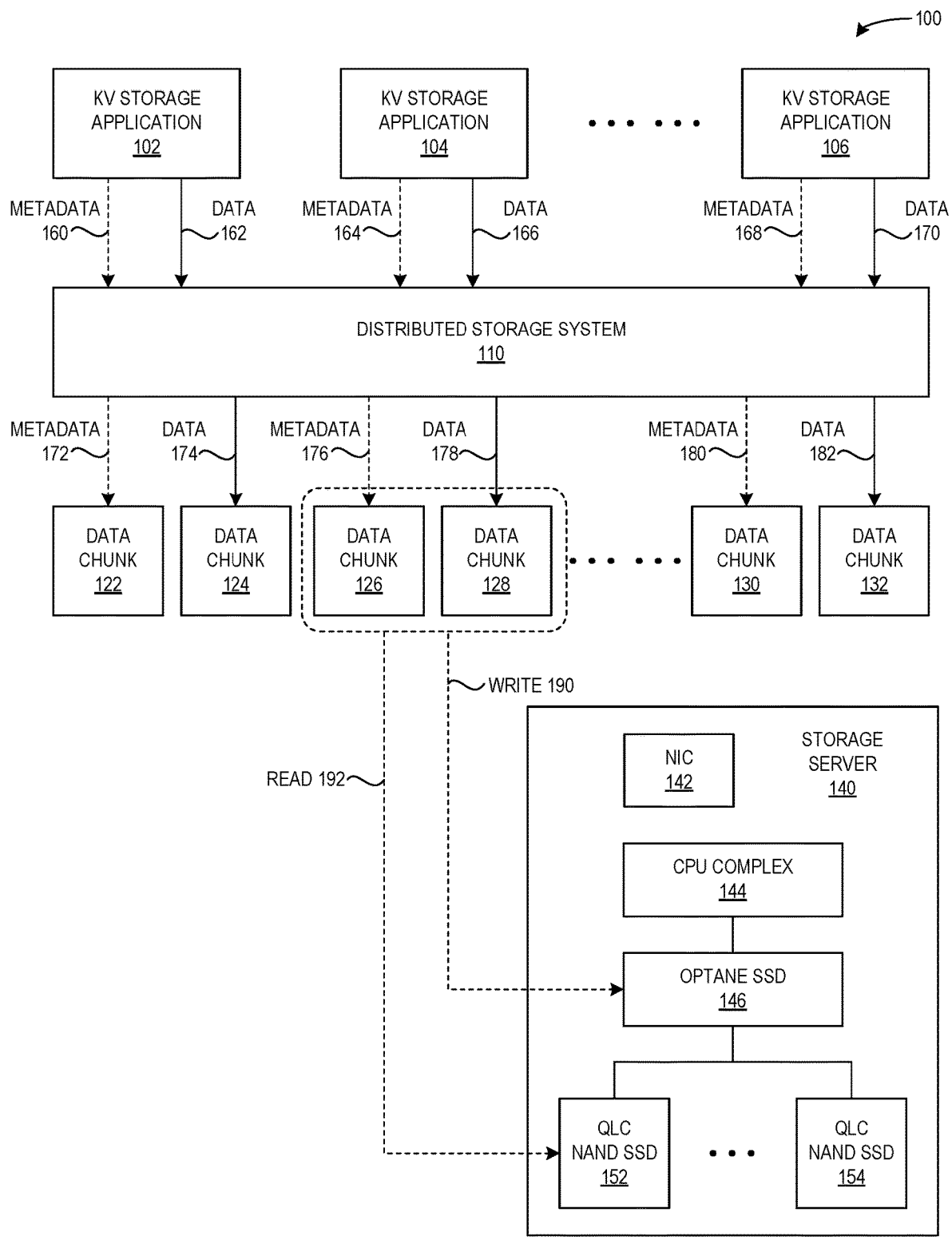
FIG. 1 illustrates an exemplary system which facilitates data placement, in accordance with the prior art.

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the embodiments described herein are not limited to the embodiments shown, but are to be accorded the widest scope consistent with the principles and features disclosed herein.

Overview

The embodiments described herein facilitate efficient utilization of high-density NAND flash, which can result in meeting the continuing need for increased capacity and decreased cost in deploying new storage servers in a data center.

As described above, as the density and capacity of memory elements continue to increase (e.g., three-dimensional stacking and inserting more bits in one NAND cell, such as in the high-density QLC NAND), the performance of the high-density NAND may decrease. While the performance of a sequential write in a high-density NAND (such as QLC) may be similar to the performance of a sequential write in a lower-density NAND (such as TLC or MLC), a significant difference exists between the high-density NAND and the lower-density NAND in the case of a read operation and a random write.

Thus, while deploying the high-density NAND in a data center may result in a decreased cost and an increase in storage capacity, some challenges remain in efficiently utilizing the high-density NAND. One solution involves using a tiered storage hierarchy by placing a faster media (such as an Optane drive) in front of the QLC SSDs, where this faster media can serve as the write cache for the QLC SSDs. However, while this solution may address the challenges associated with the performance of a random write operation, the performance of a read operation may still suffer because reading from the high-density NAND generally incurs a higher latency than reading from a lower-density NAND, as described below in relation to FIG. 1. This can result in challenges in efficiently utilizing the high-density NAND and in deploying the high-density NAND in a data center.

The embodiments described herein address these challenges by providing a system which separates and places the metadata and the data into different distributed storage clusters or servers. The system can place the metadata into a first storage cluster, such as a TLC storage server with multiple lower-density TLC NAND SSDs. Because the metadata is generally a smaller block size (i.e., a shorter length) than the data, placing the metadata in the lower-density TLC NAND storage server can result in an acceptable performance for both a read operation and a random write operation.

The system can also place the data corresponding to the metadata into a second storage cluster, such as a QLC storage server with multiple high-density QLC NAND SSDs. Furthermore, the system can implement a write cache by using a TLC SSD in front of the QLC SSDs, where the TLC SSD can serve as the write cache for the QLC SSDs. Because the data can be moved asynchronously from the write cache of the TLC SSD to the QLC SSDs, placing the data in the higher-density QLC NAND storage server can improve the previously low latency in the performance of a random write operation in the high-density QLC NAND. An exemplary system for placing metadata in the TLC storage server and placing the corresponding data in the QLC storage server is described below in relation to FIG. 2.

Specifically, the system can place the metadata in the TLC storage server, e.g., by storing the metadata in a mapping table maintained by the TLC storage server. The mapping table can include entries which indicate: a key (pre-allocated and in ascending order in the table); a logical block address (LBA) or a starting point for the corresponding data; a length of the data or a number of LBAs associated with the data; and a physical block address (PBA) in the QLC NAND at which the data is written or stored. The system can periodically perform a compaction procedure on the metadata, but the system does not need to move the data in order to perform the compaction. That is, during a garbage collection process, the system only needs to update the LBA to PBA mapping, and can leave the LBA unchanged. Thus, the system can provide a more efficient utilization because it does not need to modify the metadata in the TLC storage server. An exemplary mapping table of metadata stored in the TLC storage server is described below in relation to FIG. 3.

Moreover, the system can place the data in the QLC storage server, e.g., by writing the data sequentially in an append-only manner as key-value pairs. The data stored in the QLC storage server is only written when a write request is received, or in response to the data entering the QLC NAND or being generated for storage into the QLC NAND. After writing the data to the QLC NAND, the system does not need to physically move the data due to any periodic compaction. An exemplary placement of data stored in the QLC storage server is described below in relation to FIG. 3.

Thus, by placing the metadata and the data in separate distributed storage clusters, and by maintaining the metadata and any updates to the data/metadata in a mapping table, the embodiments described herein provide a system which addresses the challenges associated with deploying high-density NAND in a data center. This results in an improved and more efficient utilization of the high-density NAND (such as QLC NAND).

The terms "storage server," "storage cluster," and "storage system" are used interchangeably in this disclosure, and refer to a computing device which can include multiple storage drives. A distributed storage system or a distributed storage cluster can include multiple storage servers.

The terms "storage device" and "storage drive" are used interchangeably in this disclosure, and refer to a device or a drive with a non-volatile memory which can provide persistent storage of data, e.g., a solid state drive (SSD) or a hard disk drive (HDD).

The term "QLC NAND" refers to a quad-level cell (QLC) memory element which can store four bits of information per cell. A "QLC NAND SSD" refers to an SSD which uses QLC NAND flash memory.

The term "TLC NAND" refers to a triple-level cell (MLC) memory element which can store three bits of information per cell. A "TLC NAND SSD" refers to an SSD which uses TLC NAND flash memory.

The term "MLC NAND" refers to a multi-level cell (MLC) memory element which can store two bits of information per cell. An "MLC NAND SSD" refers to an SSD which uses MLC NAND flash memory.

The term "SLC NAND" refers to a single-level cell (SLC) memory element which can store two bits of information per cell. An "SLC NAND SSD" refers to an SSD which uses SLC NAND flash memory.

In this disclosure, the term "high-density NAND" or "high-density NAND flash" refers to QLC NAND. However, the term high-density NAND can also refer to any NAND which has a higher density than any other currently existing NAND.

In this disclosure, the term "low-density NAND" or "low-density NAND flash" refers to TLC NAND, MLC NAND, or SLC NAND. However, the term low-density NAND can also refer to any NAND which has a lower density than any other currently existing NAND.

While the embodiments described herein depict NAND flash as the non-volatile memory, other types of non-volatile memory (other types of physical media for persistent storage) may also be used, e.g., magneto resistive random access memory (MRAM), resistive random access memory (ReRAM), Phase Change Memory (PCM), etc.

Exemplary System in the Prior Art

FIG. 1 illustrates an exemplary system 100 which facilitates data placement, in accordance with the prior art. In system 100, multiple key-value storage applications (such as KV storage applications 102, 104, and 106) can transmit metadata and data to a distributed storage system 110, which can write the metadata and data as chunks to a single storage server 140. Storage server 140 can include a network interface card (NIC) 142, a central processing unit (CPU) complex 144, an Optane SSD 146, and QLC NAND SSDs 152 and 154 (e.g., 3D QLC SSDs).

During operation, a KV storage application can transmit metadata and data to be stored in a non-volatile memory. The metadata and data can be stored as data chunks together in a single storage server or storage drive. For example, KV storage application 104 can transmit, as part of a write request, metadata 164 and data 166 to distributed storage system 110 for storage in a non-volatile memory (such as QLC NAND SSDs 152 and 154 of storage server 140). Distributed storage system 110 can transmit metadata 164 and data 166 as one or more data chunks (e.g., data chunks 126 and 128) to storage server 140, via a write 190 operation. Storage server 140 can receive data chunks 126 and 128, and can store data chunks 126 and 128 in Optane SSD 146, which can serve as the write cache for storage server 140. The data stored in Optane SSD 146 can be written to one of QLC NAND SSDs 152 and 154.

Subsequently, KV storage application 104 (or another application) can transmit a request to read the data stored in QLC NAND SSDs 152 and 154, via a read 192 operation. Storage server 140 can retrieve the requested stored data from QLC NAND SSDs 152 and 154, and return the retrieved data to the requesting application (not shown).

While using Optane SSD 146 as a write cache for the QLC NAND SSDs can sufficiently address the latency involved in a random write operation, prior art system 100 must still read the data from QLC NAND SSDs 152 and 154. The latency involved in a read operation on a QLC NAND can be greater than the latency involved in a read operation on a TLC NAND (i.e., on a NAND memory with a lower density than the density of QLC NAND). Thus, prior art system 100 still results in a read operation with a high latency.

Furthermore, moving the data from Optane SSD write cache 146 to the QLC NAND SSDs 152 and 154 can take a considerable amount of time. As a result, the capacity of the write cache must be sufficiently large in order to accommodate the incoming write requests while avoiding an overflow. Using the high-capacity Optane SSD can therefore result in a cost which is greater than the cost associated with other SSDs of lower density (e.g., previous generations of NAND, such as TLC NAND).

One additional limitation of prior art system 100 is the high endurance requirement associated with Optane SSD write cache 146, because the write amplification factor is not a non-trivial factor, especially in the case of a random write operation. As a result, Optane SSD write cache 146 must be equipped with a high-end module which can complicate the entire storage server and storage system, and can further result in an imbalance between the performance of a read operation and a write operation.

Figure 2:
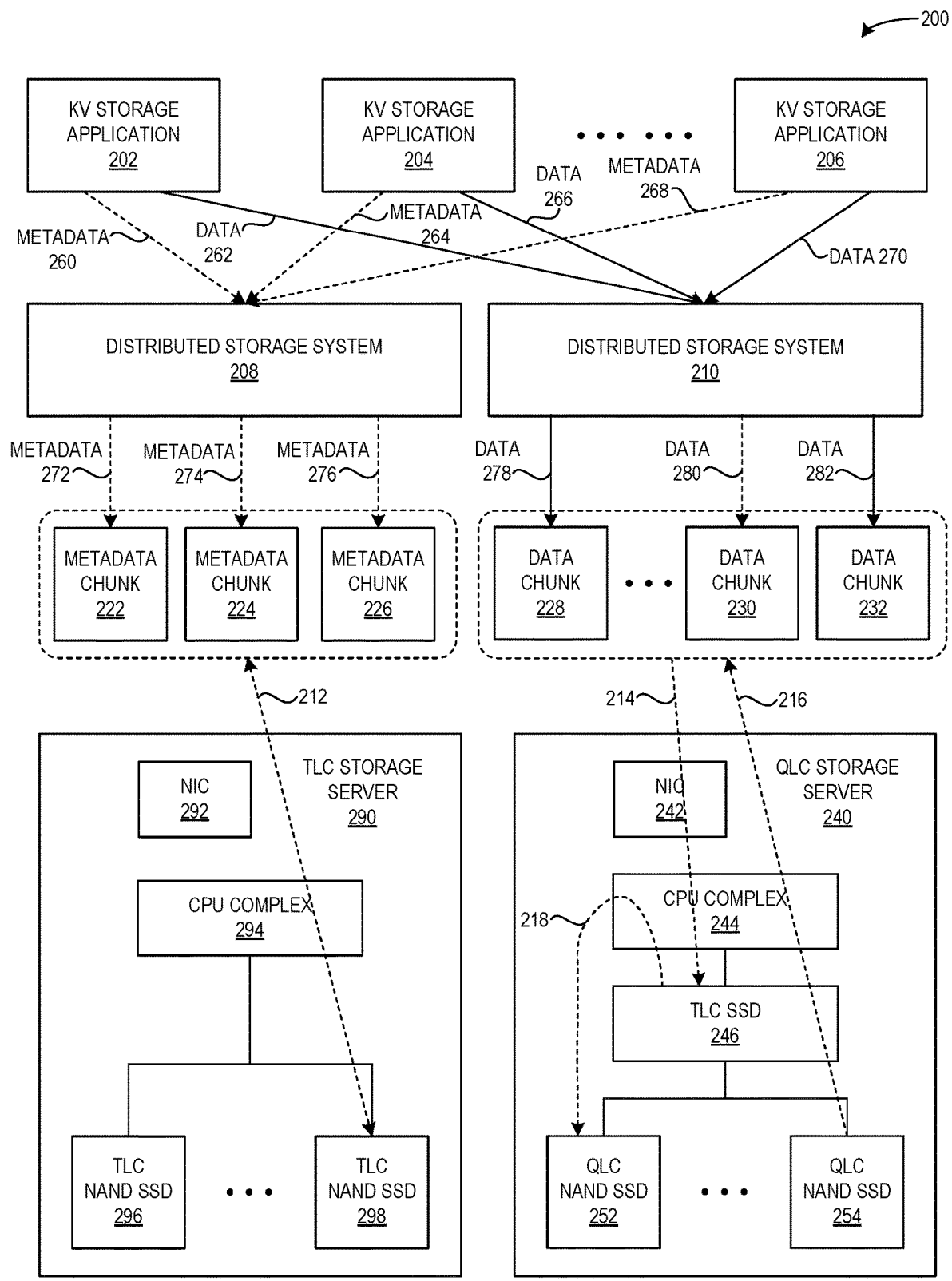
FIG. 2 illustrates an exemplary system which facilitates efficient utilization of high-density NAND flash, in accordance with an embodiment of the present application.

Exemplary System which Facilitates Efficient Utilization of High-Density NAND Flash: Separating Metadata and Data in a Write Operation FIG. 2 illustrates an exemplary system 200 which facilitates efficient utilization of high-density NAND flash, in accordance with an embodiment of the present application.

System 200 can include multiple KV storage applications which communicate with a plurality of distributed storage systems. A distributed storage system can include a plurality of storage servers, and a storage server can include a plurality of storage drives. For example, system 200 can include a distributed storage system 208 and a distributed storage system 210. Distributed storage system 208 can include at least a TLC storage server 290. TLC storage server 290 can include a NIC 242, a CPU complex 294, and at least TLC NAND SSDs 296 and 298. TLC storage server 290 can be an existing storage server, e.g., can include TLC NAND SSDs which are part of the existing infrastructure of a data center.

Distributed storage system 210 can include at least a QLC storage server 290. QLC storage server 290 can include a NIC 242, a CPU complex 244, a TLC SSD 246, and at least QLC NAND SSDs 252 and 254. QLC storage server 240 can include newly deployed high-density NAND SSDs, such as QLC NAND SSDs 252 and 254.

In system 200, data and its associated metadata are separated and written to separate storage servers, unlike in system 100, where data and associated metadata are written to a same storage server. More importantly, the metadata can be written directly to a TLC NAND SSD (in a TLC storage server) without first being placed in a write cache. Additionally, the data can be written asynchronously to a QLC NAND SSD (in a QLC storage server), after first being stored in a TLC NAND SSD which serves as a write cache for the QLC NAND SSD.

For example, each of KV storage applications 202, 204, and 206 can send metadata 260, 264, and 268 to distributed storage system 208, and can send the respective associated data 262, 266, and 270 to distributed storage system 210. Subsequently, distributed storage system 208 can send metadata 272, 274, and 276 as at least metadata chunks 222, 224, and 226 to TLC storage server 290. Specifically, metadata chunks 222, 224, and 226 can be written directly to TLC NAND SSD 298, via a communication 212. Distributed storage system 210 can send data 278, 280, and 282 as at least data chunks 228, 230, and 232 to QLC storage server 240. Specifically, data chunks 228, 230, and 232 can be sent, via a communication 214, to TLC SSD 246, which serves as the write cache for QLC NAND SSDs 252 and 254. Subsequently, the system can asynchronously write data chunks 228, 230, and 232 (which were stored in TLC SSD 246) to QLC NAND SSD 252, via a communication 218.

When system 200 receives a request to read data stored in a storage drive of QLC storage sever 240, e.g., for data stored in QLC NAND SSD 254, the requested data can be retrieved from QLC NAND SSD 254 (via a communication 216), and the associated metadata can be retrieved from TLC NAND SSD 298 (via communication 212). An exemplary read operation is described below in relation to FIG. 4.

Moreover, the metadata can be stored in a data structure or a mapping table in the TLC storage server. An entry in the mapping table can include a key for the data. The corresponding key and data ("key-value pair") can be stored in the QLC storage server. An exemplary data structure which indicates the metadata and an exemplary storage of data are described below in relation to FIG. 3.

Thus, system 200 depicts how data and its associated metadata are separated and stored in storage drives on different storage servers. That is, the metadata can be stored in an existing TLC NAND SSD cluster (i.e., in one of TLC NAND SSDs 296 and 298 of TLC storage server 290), while the data can be stored in a newly deployed QLC NAND SSD cluster (i.e., in one of QLC NAND SSDs 252 and 254). As a result, by storing the metadata in TLC storage server 290, system 200 can provide a sufficient latency for a read and a write operation for the metadata. Furthermore, by storing the data in QLC storage server 240, using TLC SSD 246 as the write cache for the QLC NAND SSDs, and asynchronously moving the data from the write cache to the QLC NAND SSDs, system 200 can also address the previously described latency issue involved in a random write operation in a QLC or other high-density storage drive.

Exemplary Mapping Table for Metadata in TLC Storage Server

In general, a system which uses a key-value (KV) storage can periodically sort the sequence of keys in metadata, and, based on this periodic sorting, can re-allocate certain locations for the data (i.e., the key-value pairs), which can result in physically moving the stored data. However, this periodic re-allocation can consume the resources in the system by creating a heavy load for random access operations (e.g., random read and write operations) in QLC NAND SSDs, which (as described above) are limited and constrained by the performance of the random access operations. In some cases, smaller keys may be generated later than larger keys, and the periodic sorting may affect the order of different size keys (e.g., keys of different lengths).

The embodiments described herein address these challenges by storing the metadata in a table or data structure in a TLC storage cluster. The data structure can include entries which indicate a key and the physical address or location at which the key and the corresponding data (key-value pair) are stored in the QLC storage cluster. Data is only written to the QLC storage cluster when it enters the QLC storage cluster and when a key has been generated for the data. Data is written to the QLC storage cluster in a sequential or an append-only manner. That is, data is written at a next sequentially available location in a storage drive of the QLC storage cluster. The system can periodically compact the metadata, but the system does not need to move the corresponding data as a result of the metadata compaction. That is, the metadata compaction does not result in moving the corresponding data. This allows the system to isolate the SSD's own garbage collection, which allows the garbage collection procedure to remain transparent. Whenever the SSD performs garbage collection, the system need only update the LBA to PBA mapping, and can leave the LBA as unchanged. The system can thus refrain from modifying the metadata on the TLC cluster.

Moreover, the system can pre-allocate the data structure, such that when data associated with a small incoming key is recorded in the metadata table of the TLC cluster, rather than shifting the entire table, the system need only fill the corresponding table entry for the incoming key. That is, the metadata mapping table can be pre-allocated ahead of time based on an ascending order for the keys. If a given key is not used, the system can maintain as invalid the corresponding entry for the given key, but the system can also maintain the sequence and the position of the entry. At a later time, when the given key is generated at the pre-allocated entry, the system can record the index of the first logical block address of the data as well as the length of the data (in the unit of LBAs). The system can obtain the LBA and length information from a current write pointer of the high-density SSD cluster.

Figure 3:
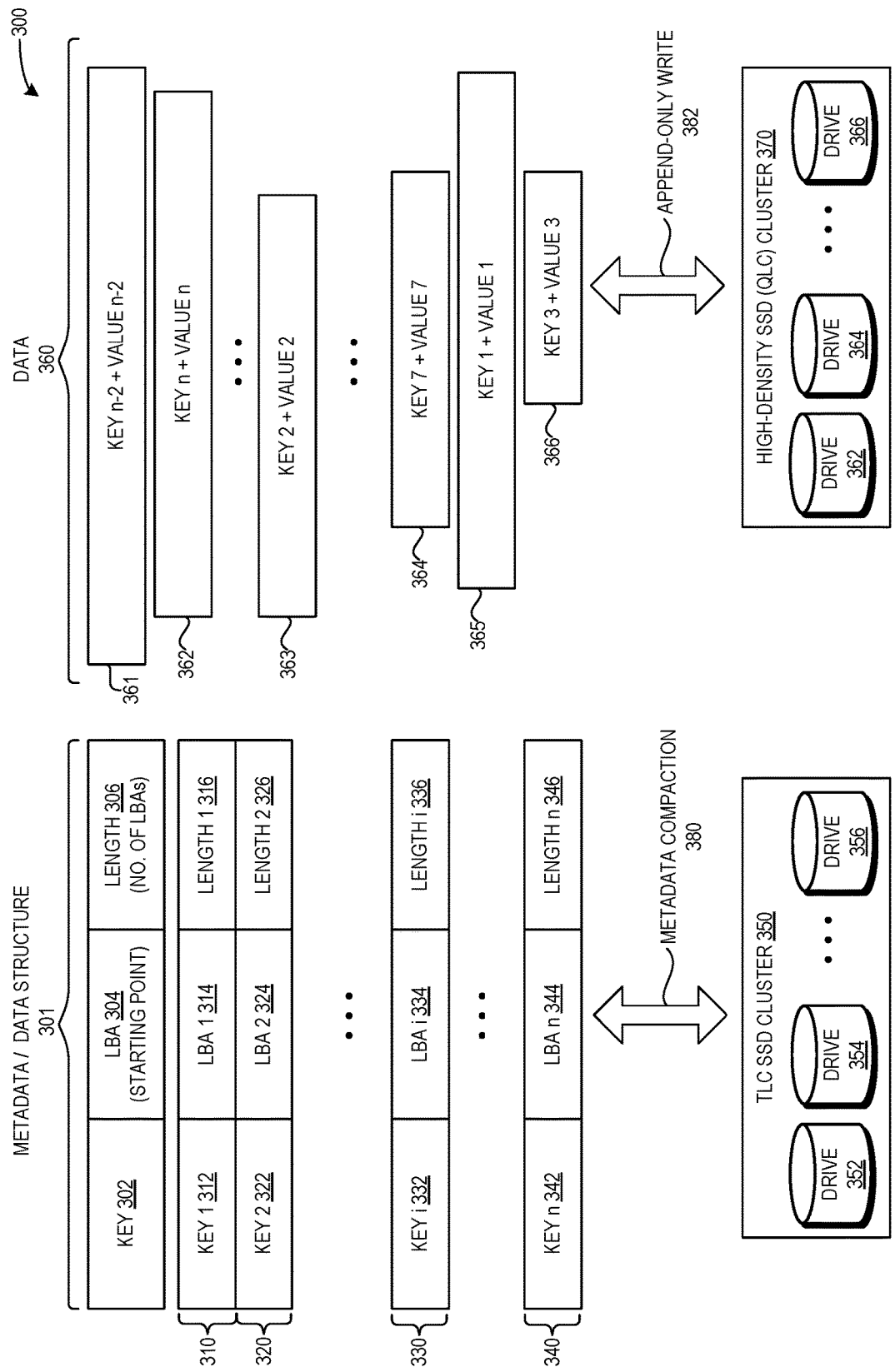
FIG. 3 illustrates an exemplary mapping table of metadata stored in a TLC SSD cluster and exemplary key-value pairs of data stored in a high-density QLC SSD cluster, in accordance with an embodiment of the present application.

FIG. 3 illustrates an exemplary mapping table 301 of metadata stored in a TLC SSD cluster and exemplary key-value pairs of data 360 stored in a high-density SSD (QLC) cluster, in accordance with an embodiment of the present application. Metadata/data structure 301 can include entries for respective data which indicate: a key 302 associated with the respective data; a logical block address (LBA) 304, which can indicate a starting point for the respective data; and a length 306 of the respective data. Entries in metadata table 301 can also indicate one or more of: a number of LBAs associated with the respective data; a number of LBAs corresponding to the key; an identifier of or a data path associated with at least one storage drive of a high-density cluster to which a portion of the respective data is written; and a physical location or a PBA in the at least one storage drive of the high-density cluster to which the respective data or portion of the respective data is written.

Data 360 can include the data corresponding to the metadata stored in table 301, where data 360 is stored as key-value pairs and written in a sequential, append-only manner to the high-density SSD (QLC) cluster. Furthermore, the key-value pairs stored in the high-density SSD (QLC) cluster can be of varying lengths (or sizes), and can be stored out of order (i.e., in an order which is different from the ascending order in which the keys are stored in the entries of metadata table 301).

For example, metadata table 301 can include entries 310, 320, 330, and 340. Entry 310 can include: a key 1 312; an LBA 1 314; and a length 1 316. Entry 310 can also indicate a PBA (not shown) in high-density SSD cluster 370 at which the corresponding data (i.e., key-value pair) is written.

Data 360 can include data 361, 362, 363, 364, 365, and 366. The corresponding data (key-value pair) for the metadata indicated in entry 310 is indicated as data 365 ("Key 1+Value 1"), where the physical location or PBA associated with data 365 can be indicated in entry 310.

Communications in an Exemplary Read Operation

Figure 4:
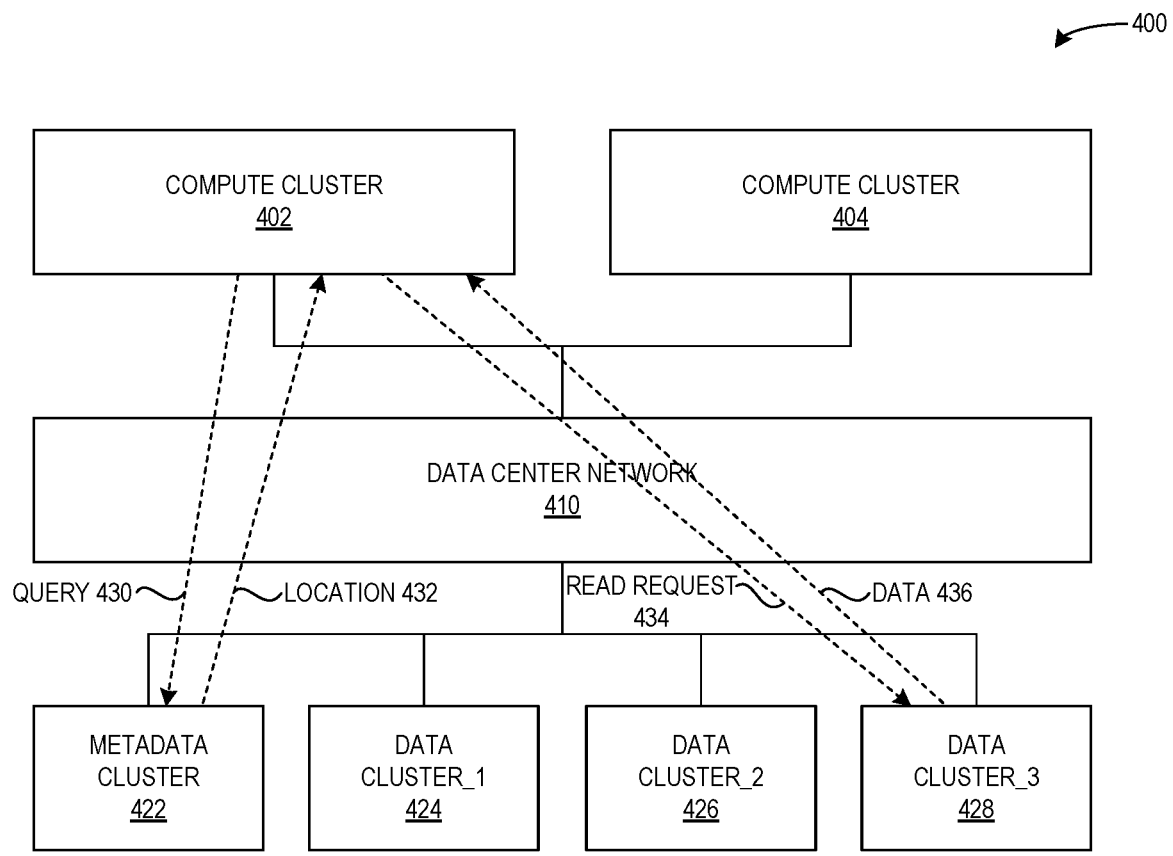
FIG. 4 illustrates an exemplary system and communications associated with a read operation, in accordance with an embodiment of the present application.

FIG. 4 illustrates an exemplary system 400 and communications associated with a read operation, in accordance with an embodiment of the present application. System 400 can include: a computer cluster 402 and a compute cluster 404; a data center network 410; a metadata cluster 422; a data cluster_1 422; a data cluster_1 424; a data cluster_1 426; and a data cluster_3 428. Compute clusters 402 and 404 can include KV storage applications. Data center network 410 can include multiple distributed storage systems. Metadata cluster 422 can be an existing storage server or storage cluster with storage drives of a lower-density NAND, such as a TLC NAND storage server or cluster. Metadata cluster 422 can maintain a mapping table, as described above in relation to FIG. 3. Each of data clusters 424-428 can be a newly deployed storage server or storage cluster with storage drives of a high-density NAND, such as a QLC NAND storage server or cluster.

During operation, system 400 can receive a request to read data stored in the non-volatile memory of system 400. Compute cluster 402 can send, via data center network 410, a query 430 to metadata cluster 422. Metadata cluster 422 can perform a lookup in the mapping table (not shown) based on a generated key corresponding to the requested data. That is, metadata cluster 422 can obtain, based on the key, the metadata from a storage drive of metadata cluster 422 by identifying an entry in the pre-allocated data structure, i.e., the mapping table. The identified entry can indicate the physical location, PBA, data path, and/or storage drive identifier (i.e., information which indicates "physical location 432") in which the requested data is stored. Metadata cluster 422 can return the corresponding physical location 432 to compute cluster 402, where physical location 432 can correspond to a location in a non-volatile storage media of data cluster_3 428. Subsequently, compute cluster 402 can send a read request 434 to the identified data cluster_3 428, to obtain the data stored at physical location 432. Data cluster_3 428 can retrieve the requested data, and return the requested data 436 to compute cluster 402.

Because of the smaller block sizes and amount of metadata, in comparison to the corresponding data (stored at key-value pairs), the metadata of metadata cluster 422 (e.g., the KV storage engine) does not require a significant amount of storage capacity. This allows metadata cluster 422 to continue performing other operations and providing other services. Overall, data is written sequentially to the high-density NAND, and the stored data is read at random. However, within a single read operation, the read is also sequential. Thus, the embodiments described herein allow the system to essentially or equivalently convert the read into a sequential manner, which can relax the performance requirement on the high-density NAND and result in an improved read latency.

Exemplary Data Placement in a System with Increased Parallelism

Figure 5:
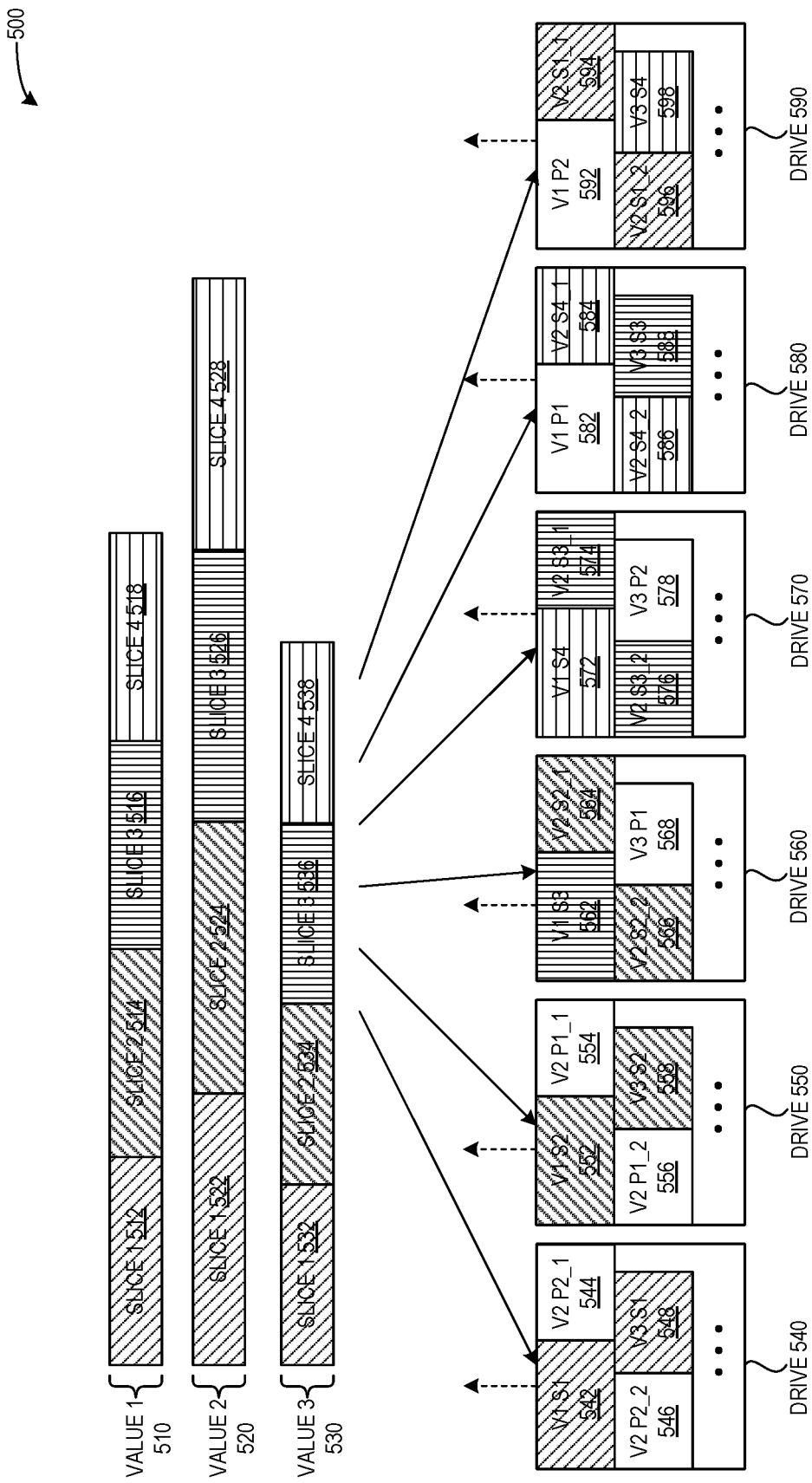
FIG. 5 illustrates an exemplary data placement and improved throughput based on an increase in parallelism to mitigate the limitation in a read operation, in accordance with an embodiment of the present application.

FIG. 5 illustrates an exemplary data placement 500 and improved throughput based on an increase in parallelism to mitigate the limitation in a read operation, in accordance with an embodiment of the present application. Recall that the length of data can vary, and that in the described embodiments, key-value pairs of varying lengths are stored in a sequential manner, as depicted above in relation to FIG. 3. For a given data or given key-value pair, the system can perform erasure coding (EC) on the given data or key-value pair to obtain an EC codeword which includes the EC parity. The system can equally or evenly divide the EC codeword into a plurality of parts, and distribute the parts in a stripped manner across all the storage drives in the high-density storage cluster by placing each part in a specific storage drive at a next sequentially available location in the specific storage drive.

Exemplary data placement 500 can include a value 1 510, a value 2 520, and a value 3 530, for placement into six high-density storage drives 540, 550, 560, 570, 580, and 590. Each of these values comprises an EC codeword. That is, each of these values is a key-value pair of data which has been EC-encoded and includes the EC parity bits. Each EC codeword is equally or evenly divided into a predetermined number of parts. This predetermined number can be configured or set by the system or a user. For a given value, each slice is distributed across each of the available drives in a sequential, append-only manner.

In data placement 500, value 1 510 is divided into four slices: a slice 1 512 (indicated with left-slanting diagonal lines); a slice 2 514 (indicated with right-slanting diagonal lines); a slice 3 516 (indicated with horizontal lines); and a slice 4 518 (indicated with vertical lines). Similarly, value 2 520 is divided into four slices: a slice 1 522 (indicated with left-slanting diagonal lines); a slice 2 524 (indicated with right-slanting diagonal lines); a slice 3 526 (indicated with horizontal lines); and a slice 4 528 (indicated with vertical lines). In addition, value 3 530 is divided into four slices: a slice 1 532 (indicated with left-slanting diagonal lines); a slice 2 534 (indicated with right-slanting diagonal lines); a slice 3 536 (indicated with horizontal lines); and a slice 4 538 (indicated with vertical lines). Each value can also include at least one parity slice (not shown in values 1-3 510-530, but indicated below as stored in drives 540-590).

The system can place each slice of a given value in a different drive. For example: value 1 slice 1 512 is written as V1 S1 542 to drive 540; value 1 slice 2 514 is written as V1 S2 552 to drive 550; value 1 slice 3 516 is written as V1 S3 562 to drive 560; value 1 slice 4 518 is written as V1 S4

572 to drive 570; value 1 parity 1 (V1 P1 582) is written to drive 580; and value 1 parity 2 (V1 P2 592) is written to drive 590. The system can write each of the slices of values 2 520 and value 3 530 in a similar fashion. In some instances, a slice may be spread across multiple pages or blocks (e.g., V2 S2_1 564 and V2 S2_2 566 in drive 560). As described above, in each physical high-density storage drive, the data is written sequentially, such that a new portion of data always follows the end of the last write. Furthermore, the EC parity is only accessed in limited circumstances in order to recover data in the event of an error.

By using erasure coding and placing the divided slices onto multiple high-density storage drives, the system can save storage capacity by avoiding multiple replicas, and can also activate the multiple high-density storage drives in parallel to further increase the throughput. This can result in an improved performance and a more efficient overall storage system.

Figure 6A:
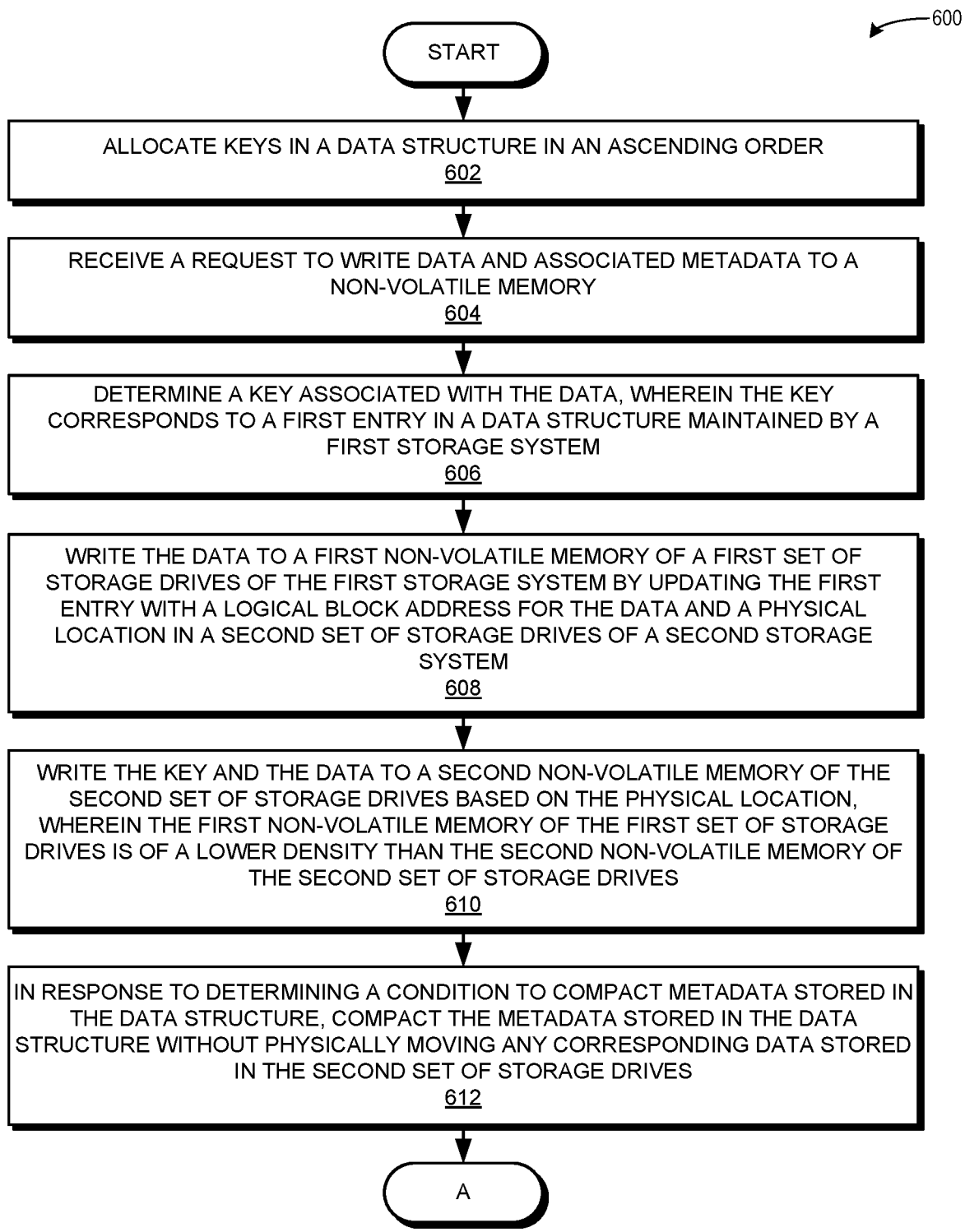
FIG. 6A presents a flowchart illustrating a method for facilitating efficient utilization of high-density NAND flash, including a write operation, in accordance with an embodiment of the present application.

Exemplary Method for Facilitating Efficient Utilization of High-Density NAND Flash FIG. 6A presents a flowchart 600 illustrating a method for facilitating efficient utilization of high-density NAND flash, including a write operation, in accordance with an embodiment of the present application. During operation, the system allocates keys in a data structure in an ascending order (operation 602). The keys can be allocated in the data structure prior to the system receiving or processing any input/output (I/O) requests, and the data structure can be considered a pre-allocated data structure. The system receives a request to write data and associated metadata to a non-volatile memory (operation 604). The write request can be received from a key-value storage application, as depicted above in relation to FIG. 2. The system determines a key associated with the data, wherein the key corresponds to a first entry in a data structure maintained by a first storage system (operation 606).

The system writes the metadata to a first non-volatile memory of a first set of storage drives of the first storage system by updating the first entry with a logical block address for the data and a physical location in a second set of storage drives of a second storage system (operation 608). The physical location can be a next sequentially available location in the second set of storage drives. The system writes the key and the data to a second non-volatile memory of the second set of storage drives based on the physical location, wherein the second non-volatile memory of the first set of storage drives is of a lower density than the second non-volatile memory of the second set of storage drives (operation 610). An exemplary set of operations performed as part of writing the key and the data to the second non-volatile memory of the second set of storage drives is described below in relation to FIG. 6B. In response to determining a condition to compact metadata stored in the data structure, the system compacts the metadata stored in the data structure without physically moving any corresponding data stored in the second set of storage drives (operation 612). The operation continues as described at Label A of FIG. 7.

Figure 6B:
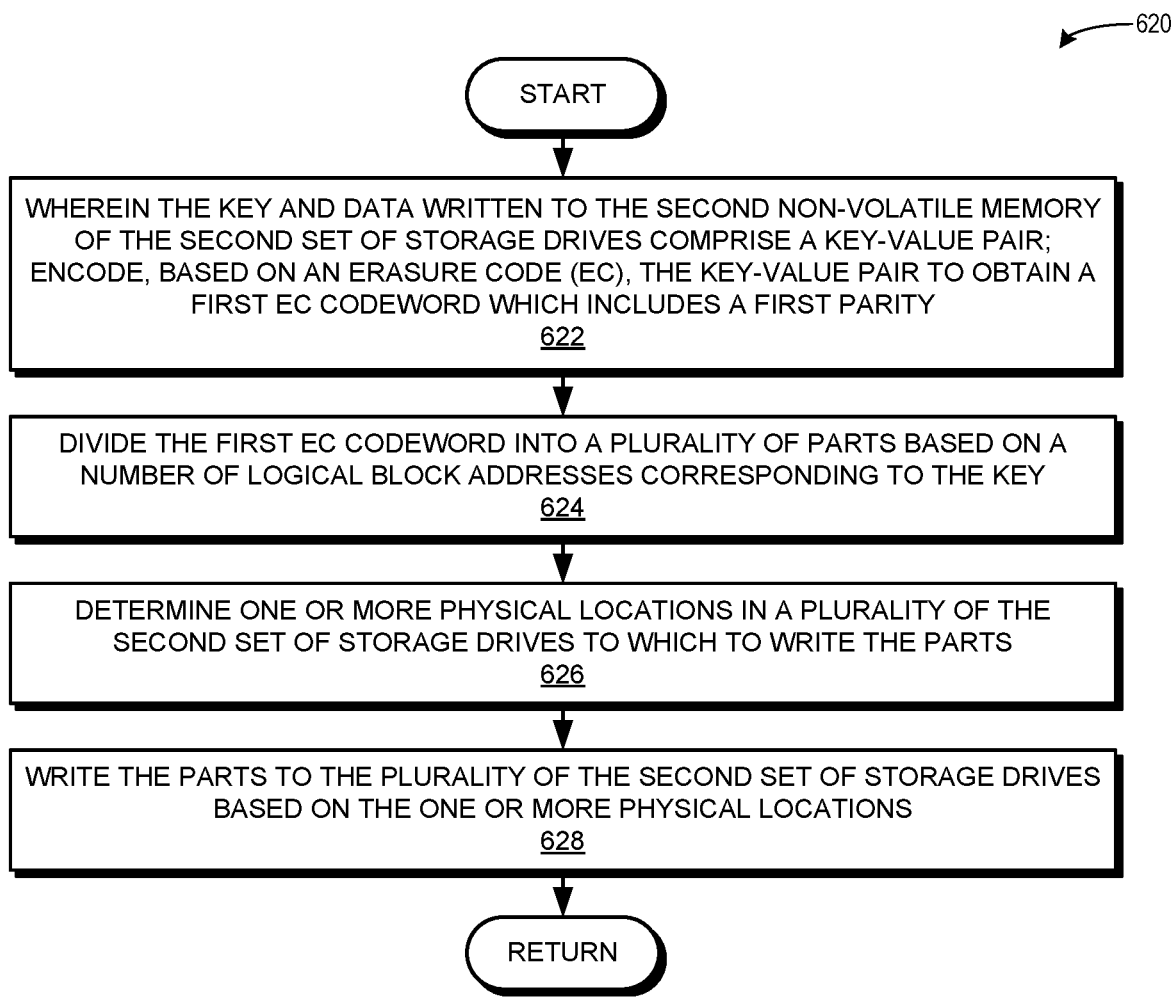
FIG. 6B presents a flowchart illustrating a method for facilitating efficient utilization of high-density NAND flash, including an increased parallelism, in accordance with an embodiment of the present application.

FIG. 6B presents a flowchart 620 illustrating a method for facilitating efficient utilization of high-density NAND flash, including an increased parallelism, in accordance with an embodiment of the present application. The operations illustrated in flowchart 620 can include operations performed as part of operation 610 of FIG. 6A. During operation, the key and the data written to the second non-volatile memory of the second set of storage drives comprise a key-value pair, and the system encodes, based on an erasure code (EC), the key-value pair to obtain a first EC codeword which includes a first parity (operation 622). The system divides the first EC codeword into a plurality of parts based on a number of logical block addresses corresponding to the key (operation 624). The number of the plurality of parts may be a predetermined number configured by the system or by a user, and the system can evenly or equally divide the first EC codeword such that the predetermined number of parts are of an equal size or length. The system determines one or more physical locations in a plurality of the second set of storage drives to which to write the parts (operation 626). The system writes the parts to the plurality of the second set of storage drives based on the one or more physical locations (operation 628).

Figure 7:
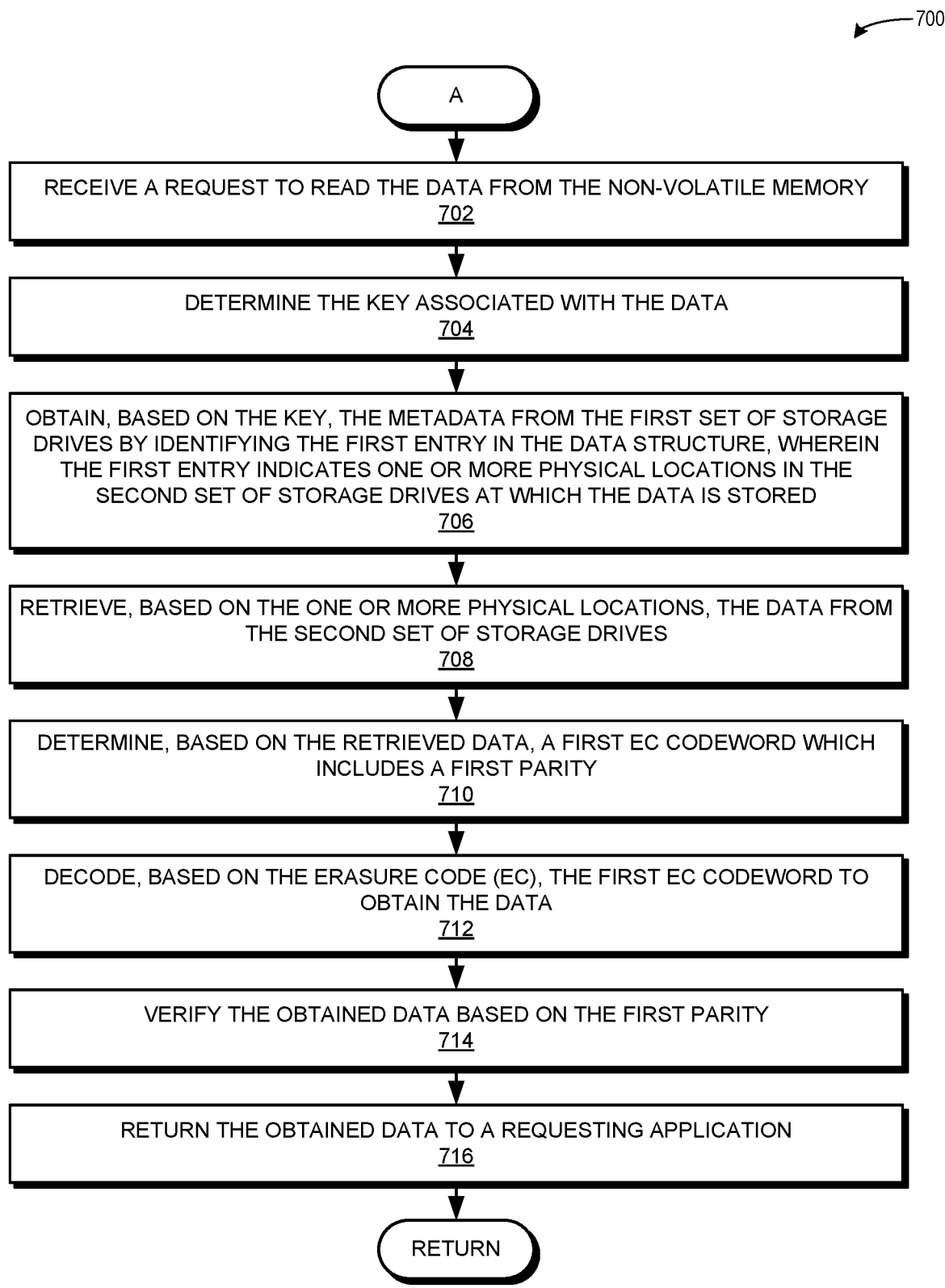
FIG. 7 presents a flowchart illustrating a method for facilitating efficient utilization of high-density NAND flash, including a read operation, in accordance with an embodiment of the present application.

FIG. 7 presents a flowchart 700 illustrating a method for facilitating efficient utilization of high-density NAND flash, including a read operation, in accordance with an embodiment of the present application. The operations in flowchart 700 can occur after the operations described above in relation to FIG. 6A. The system receives a request to read the data from the non-volatile memory (operation 702). The system determines the key associated with the data (operation 704). The system obtains, based on the key, the metadata from the first set of storage drives by identifying the first entry in the data structure, wherein the first entry indicates one or more physical locations in the second set of storage drives at which the data is stored (operation 706). The system retrieves, based on the one or more physical locations, the data from the second set of storage drives (operation 708).

The system determines, based on the retrieved data, a first EC codeword which includes a first parity (operation 710). The system decodes, based on the erasure code (EC), the first EC codeword to obtain the data (operation 712). The system verifies the obtained data based on the first parity (operation 714). The system returns the obtained data to a requesting application (or a requesting host) (operation 716).

Exemplary Computer System

Figure 8:
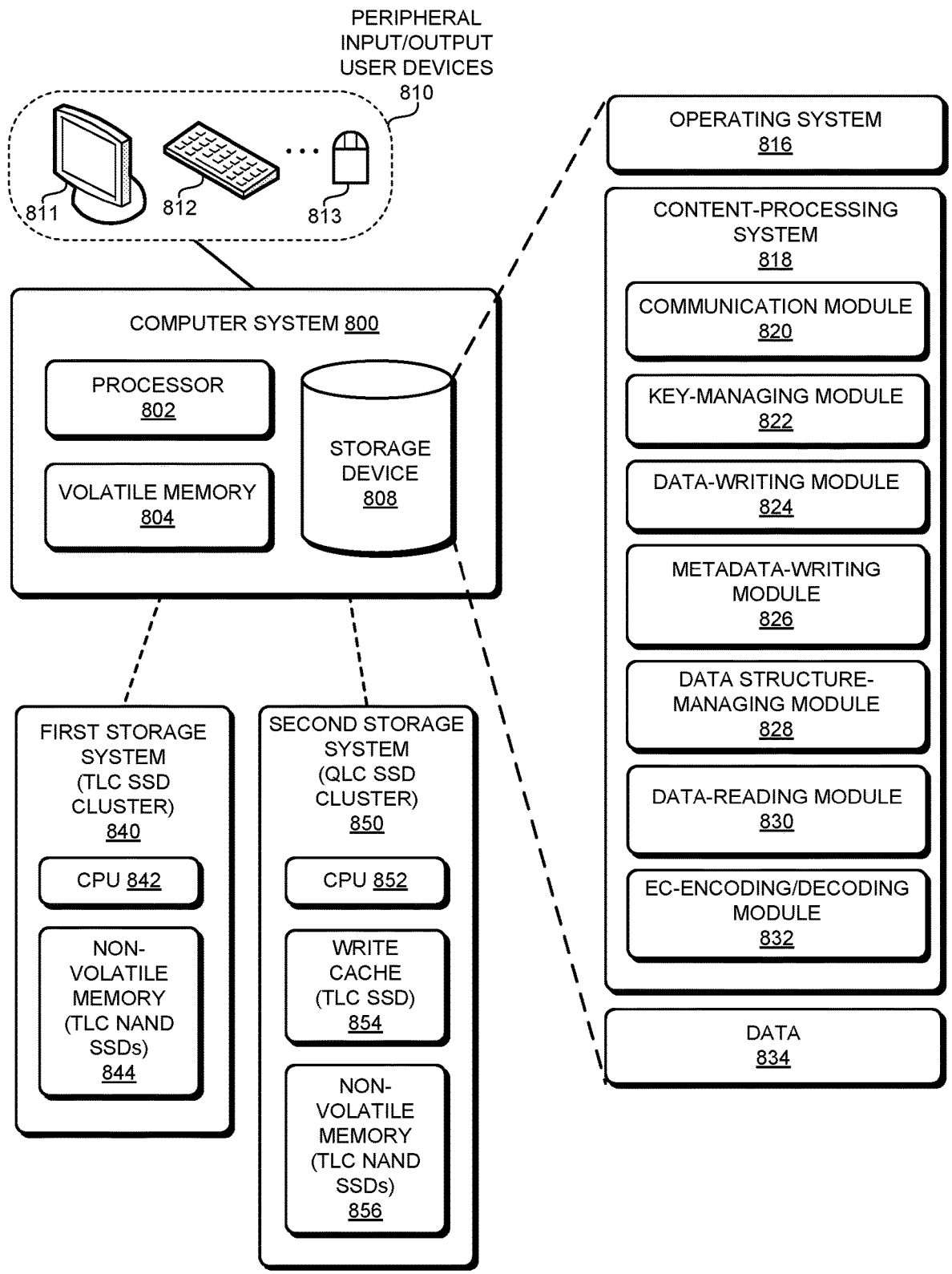
FIG. 8 illustrates an exemplary computer system that facilitates efficient utilization of high-density NAND flash, in accordance with an embodiment of the present application.

FIG. 8 illustrates an exemplary computer system 800 that facilitates efficient utilization of high-density NAND flash, in accordance with an embodiment of the present application. Computer system 800 includes a processor 802, a volatile memory 804, and a storage device 808. Volatile memory 804 can include, e.g., random access memory (RAM), that serves as a managed memory, and can be used to store one or more memory pools. Storage device 808 can include persistent storage which can be managed or accessed via processor 802. Furthermore, computer system 800 can be coupled to peripheral input/output (I/O) user devices 810, e.g., a display device 811, a keyboard 812, and a pointing device 814. Storage device 808 can store an operating system 816, a content-processing system 818, and data 834. Computer system 800 can also communicate with a first storage system 840 (e.g., a TLC SSD cluster 840) and a second storage system 850 (e.g., a QLC SSD cluster). First storage system 840 can include a CPU 842 and a non-volatile memory 844 (such as TLC NAND SSDs 844). Second storage system 850 can include a CPU 852, a write cache 854 (such as a TLC SSD 854), and a non-volatile memory 856 (such as QLC NAND SSDs 856). First storage system 840 can be a TLC SSD cluster and can correspond to TLC storage server 290 of FIG. 2, and can store metadata for a write request. Second storage system 850 can be a QLC SSD cluster and can correspond to QLC storage server 240 of FIG. 2, and can store the associated data (of the stored metadata) for the write request.

Content-processing system 818 can include instructions, which when executed by computer system 800, can cause computer system 800 to perform methods and/or processes described in this disclosure. Specifically, content-processing system 818 can include instructions for receiving and transmitting data packets, including data to be read or written, an input/output (I/O) request (e.g., a read request or a write request), and metadata and data associated with an I/O request (communication module 820).

Content-processing system 818 can include instructions for receiving a request to write data and associated metadata to a non-volatile memory (communication module 820). Content-processing system 818 can include instructions for determining a key associated with the data, wherein the key corresponds to a first entry in a data structure maintained by a first storage system (key-managing module 822). Content-processing system 818 can include instructions for writing the metadata to a first non-volatile memory of a first set of storage drives of the first storage system by updating the first entry with a logical block address for the data and a physical location in a second set of storage drives of a second storage system (metadata-writing module 826, which can communicate with first storage system 840 and store the metadata in non-volatile memory 844). Content-processing system 818 can include instructions for writing the key and the data to a second non-volatile memory of the second set of storage drives based on the physical location, wherein the first non-volatile memory of the first set of storage drives is of a lower density than the second non-volatile memory of the second set of storage drives (data-writing module 824, which can communicate with second storage system 850 and store the data in non-volatile memory 854, where the data is subsequently written to non-volatile memory 856).

Content-processing system 818 can include instructions for, prior to receiving the request to write the data and the associated metadata, allocating keys in the data structure in an ascending order (key-managing module 822). Content-processing system 818 can include instructions for, in response to determining a condition to compact metadata stored in the data structure, compacting the metadata stored in the data structure without physically moving any corresponding data stored in the second set of storage drives (data structure-managing module 828).

Content-processing system 818 can include instructions for encoding, based on an erasure code (EC), the key-value pair to obtain a first EC codeword which includes a first parity (EC-encoding/decoding module 832). Content-processing system 818 can include instructions for dividing the first EC codeword into a plurality of parts based on a number of logical block addresses corresponding to the key (data-writing module 824). Content-processing system 818 can include instructions for determining one or more physical locations in a plurality of the second set of storage drives to which to write the parts (data-writing module 824). Content-processing system 818 can include instructions for writing the parts to the plurality of the second set of storage drives based on the one or more physical locations (data-writing module 824).

Content-processing system 818 can include instructions for receiving a request to read the data from the non-volatile memory (communication module 820). Content-processing system 818 can include instructions for determining the key associated with the data (key-managing module 822). Content-processing system 818 can include instructions for obtaining, based on the key, the metadata from the first set of storage drives by identifying the first entry in the data structure, wherein the first entry indicates one or more physical locations in the second set of storage drives at which the data is stored (data-reading module 830 and data structure-managing module 828). Content-processing system 818 can include instructions for retrieving, based on the one or more physical locations, the data from the second set of storage drives (data-reading module 830).

Data 834 can include any data that is required as input or generated as output by the methods and/or processes described in this disclosure. Specifically, data 834 can store at least: data; a request; a read request; a write request; an input/output (I/O) request; data associated with a read request, a write request, or an I/O request; metadata; a key; a data structure; an entry; a logical block address; a key associated with the data; a logical block address or a starting point for the data; a length of the data; a number of logical block addresses associated with the data; a number of logical block addresses corresponding to the key; an identifier of one or more storage drives of the second set to which a portion of the data is written; a data path associated with one or more storage drives of the second set to which a portion of the data is written; a physical location in the set of second storage drives to which the data is written; a physical block address in the set of second storage drives at which the data is written; an ascending order; a condition to compact metadata; a key-value pair; an erasure code (EC); a codeword; an EC codeword; parity bits; a part; a plurality of parts; a predetermined number of slices or parts; an indicator of a storage drive or a set of storage drives or a system or a storage system; encoded data; decoded data; and a result of a verification of data based on corresponding parity bits.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described above can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

The foregoing embodiments described herein have been presented for purposes of illustration and description only. They are not intended to be exhaustive or to limit the embodiments described herein to the forms disclosed. Accordingly, many modifications and variations will be apparent to practitioners skilled in the art. Additionally, the above disclosure is not intended to limit the embodiments described herein. The scope of the embodiments described herein is defined by the appended claims.

What is claimed is:

1. A computer-implemented method, comprising:
   receiving a request to write data and associated metadata to a non-volatile memory;
   determining a key associated with the data, wherein the key corresponds to a first entry in a data structure maintained by a first storage system,
   wherein the data structure is maintained by and stored in a first storage system with a first set of storage drives, and
   wherein the data structure includes entries which map keys to physical locations in a second set of storage drives of a second storage system which is distinct from the first storage system;
   writing the received metadata to a first non-volatile memory of the first set of storage drives of the first storage system by modifying the data structure by updating the first entry with a logical block address for the data and a physical location in the second set of storage drives of the second storage system; and
   writing the key and the data to a second non-volatile memory of the second set of storage drives based on the physical location, wherein the first non-volatile memory of the first set of storage drives is of a lower density than the second non-volatile memory of the second set of storage drives.

2. The method of claim 1, wherein writing the key and the data to the second non-volatile memory comprises:
   writing, to a write cache for the second set of storage drives, the key and the data; and
   writing, from the write cache to the second non-volatile memory, the key and the data;
   wherein the write cache comprises a third storage drive which includes a third non-volatile memory of a lower density than the second non-volatile memory of the second set of storage drives.

3. The method of claim 1, further comprising:
   prior to receiving the request, allocating keys in the data structure in an ascending order; and
   in response to determining a condition to compact metadata stored in the data structure, compacting the metadata stored in the data structure without physically moving any corresponding data stored in the second set of storage drives.

4. The method of claim 1, wherein the first entry in the data structure indicates one or more of:
   a key associated with the data;
   a logical block address or a starting point for the data;
   a length of the data;
   a number of logical block addresses associated with the data;
   a number of logical block addresses corresponding to the key;
   an identifier of one or more storage drives of the second set to which a portion of the data is written;
   a data path associated with one or more storage drives of the second set to which a portion of the data is written;
   a physical location in the set of second storage drives to which the data is written; and
   a physical block address in the set of second storage drives at which the data is written.

5. The method of claim 1, wherein the key and the data written to the second non-volatile memory comprise a key-value pair, and wherein writing the key-value pair to the second non-volatile memory of the second set of storage drives comprises:
   encoding, based on an erasure code (EC), the key-value pair to obtain a first EC codeword which includes a first parity;
   dividing the first EC codeword into a plurality of parts based on a number of logical block addresses corresponding to the key;
   determining one or more physical locations in a plurality of the second set of storage drives to which to write the parts; and
   writing the parts to the plurality of the second set of storage drives based on the one or more physical locations.

6. The method of claim 1,
   wherein the second non-volatile memory of the second set of storage drives comprises quad-level cell (QLC) NAND flash, and
   wherein the first non-volatile memory of the first set of storage drives comprises one or more of:
   single-level cell (SLC) NAND flash;
   multi-level cell (MLC) NAND flash; and
   triple-level cell (TLC) NAND flash.

7. The method of claim 1, further comprising:
   receiving a request to read the data from the non-volatile memory;
   determining the key associated with the data;
   obtaining, based on the key, the metadata from the first set of storage drives by identifying the first entry in the data structure,
   wherein the first entry indicates one or more physical locations in the second set of storage drives at which the data is stored; and
   retrieving, based on the one or more physical locations, the data from the second set of storage drives.

8. The method of claim 7, further comprising:
   determining, based on the retrieved data, a first EC codeword which includes a first parity;
   decoding the first EC codeword to obtain the data;
   verifying the obtained data based on the first parity; and
   returning the obtained data to a requesting application.

9. A computer system, comprising:
   a processor; and
   a memory coupled to the processor and storing instructions, which when executed by the processor cause the processor to perform a method, the method comprising:
   receiving a request to write data and associated metadata to a non-volatile memory;
   determining a key associated with the data, wherein the key corresponds to a first entry in a data structure maintained by a first storage system,
   wherein the data structure is maintained by and stored in a first storage system with a first set of storage drives, and
   wherein the data structure includes entries which map keys to physical locations in a second set of storage drives of a second storage system which is distinct from the first storage system;
   writing the received metadata to a first non-volatile memory of the first set of storage drives of the first storage system by modifying the data structure by updating the first entry with a logical block address for the data and a physical location in the second set of storage drives of the second storage system; and
   writing the key and the data to a second non-volatile memory of the second set of storage drives based on the physical location, wherein the first non-volatile memory of the first set of storage drives is of a lower density than the second non-volatile memory of the second set of storage drives.

10. The computer system of claim 9, wherein writing the key and the data to the second non-volatile memory comprises:
    writing, to a write cache for the second set of storage drives, the key and the data; and
    writing, from the write cache to the second non-volatile memory, the key and the data;
    wherein the write cache comprises a third storage drive which includes a third non-volatile memory of a lower density than the second non-volatile memory of the second set of storage drives.

11. The computer system of claim 9, wherein the method further comprises:
    prior to receiving the request, allocating keys in the data structure in an ascending order; and
    in response to determining a condition to compact metadata stored in the data structure, compacting the metadata stored in the data structure without physically moving any corresponding data stored in the second set of storage drives.

12. The computer system of claim 9, wherein the first entry in the data structure indicates one or more of:
    a key associated with the data;
    a logical block address or a starting point for the data;
    a length of the data;
    a number of logical block addresses associated with the data;
    a number of logical block addresses corresponding to the key;
    an identifier of one or more storage drives of the second set to which a portion of the data is written;
    a data path associated with one or more storage drives of the second set to which a portion of the data is written;
    a physical location in the set of second storage drives to which the data is written; and
    a physical block address in the set of second storage drives at which the data is written.

13. The computer system of claim 9, wherein the key and the data written to the second non-volatile memory comprise a key-value pair, and wherein writing the key-value pair to the second non-volatile memory of the second set of storage drives comprises:
    encoding, based on an erasure code (EC), the key-value pair to obtain a first EC codeword which includes a first parity;
    dividing the first EC codeword into a plurality of parts based on a number of logical block addresses corresponding to the key;
    determining one or more physical locations in a plurality of the second set of storage drives to which to write the parts; and
    writing the parts to the plurality of the second set of storage drives based on the one or more physical locations.

14. The computer system of claim 9,
    wherein the second non-volatile memory of the second set of storage drives comprises quad-level cell (QLC) NAND flash, and
    wherein the first non-volatile memory of the first set of storage drives comprises one or more of:
      single-level cell (SLC) NAND flash;
      multi-level cell (MLC) NAND flash; and
      triple-level cell (TLC) NAND flash.

15. The computer system of claim 9, wherein the method further comprises:
    receiving a request to read the data from the non-volatile memory;
    determining the key associated with the data;
    obtaining, based on the key, the metadata from the first set of storage drives by identifying the first entry in the data structure,
    wherein the first entry indicates one or more physical locations in the second set of storage drives at which the data is stored; and
    retrieving, based on the one or more physical locations, the data from the second set of storage drives.

16. The computer system of claim 15, wherein the method further comprises:
    determining, based on the retrieved data, a first EC codeword which includes a first parity;
    decoding the first EC codeword to obtain the data;
    verifying the obtained data based on the first parity; and
    returning the obtained data to a requesting application.

17. A non-transitory computer-readable storage medium storing instructions that when executed by a computer cause the computer to perform a method, the method comprising:
    receiving a request to write data and associated metadata to a non-volatile memory;
    determining a key associated with the data, wherein the key corresponds to a first entry in a data structure maintained by a first storage system,
    wherein the data structure is maintained by and stored in a first storage system with a first set of storage drives, and
    wherein the data structure includes entries which map keys to physical locations in a second set of storage drives of a second storage system which is distinct from the first storage system;
    writing the received metadata to a first non-volatile memory of the first set of storage drives of the first storage system by modifying the data structure by updating the first entry with a logical block address for the data and a physical location in the second set of storage drives of the second storage system; and
    writing the key and the data to a second non-volatile memory of the second set of storage drives based on the physical location, wherein the first non-volatile memory of the first set of storage drives is of a lower density than the second non-volatile memory of the second set of storage drives.

18. The storage medium of claim 17, wherein writing the key and the data to the second non-volatile memory comprises:
    writing, to a write cache for the second set of storage drives, the key and the data; and
    writing, from the write cache to the second non-volatile memory, the key and the data;
    wherein the write cache comprises a third storage drive which includes a third non-volatile memory of a lower density than the second non-volatile memory of the second set of storage drives.

19. The storage medium of claim 17, wherein the method further comprises:
    prior to receiving the request, allocating keys in the data structure in an ascending order; and
    in response to determining a condition to compact metadata stored in the data structure, compacting the metadata stored in the data structure without physically moving any corresponding data stored in the second set of storage drives.

20. The storage medium of claim 17, wherein the key and the data written to the second non-volatile memory comprise a key-value pair, and wherein writing the key-value pair to the second non-volatile memory of the second set of storage drives comprises:

encoding, based on an erasure code (EC), the key-value pair to obtain a first EC codeword which includes a first parity;

dividing the first EC codeword into a plurality of parts based on a number of logical block addresses corresponding to the key;

determining one or more physical locations in a plurality of the second set of storage drives to which to write the parts; and writing the parts to the plurality of the second set of storage drives based on the one or more physical locations.

* * * * *